US009921865B2

(12) United States Patent
Tsirkin et al.

(10) Patent No.: US 9,921,865 B2
(45) Date of Patent: Mar. 20, 2018

(54) POPULATION OF SYSTEM TABLES BY HYPERVISOR

(71) Applicant: Red Hat Israel, Ltd., Raanana (IL)

(72) Inventors: Michael Tsirkin, Tel Aviv (IL); Gerd Hoffman, Feldberger Seenlandschaft (DE)

(73) Assignee: Red Hat Israel, Ltd., Raanana (IL)

( * ) Notice: Subject to any disclaimer, the term of this patent is extended or adjusted under 35 U.S.C. 154(b) by 253 days.

(21) Appl. No.: 14/168,997

(22) Filed: Jan. 30, 2014

(65) Prior Publication Data

US 2015/0212841 A1    Jul. 30, 2015

(51) Int. Cl.
  *G06F 9/455*    (2006.01)
  *G06F 9/44*    (2018.01)

(52) U.S. Cl.
  CPC ........ *G06F 9/45558* (2013.01); *G06F 9/4418* (2013.01); *G06F 2009/45575* (2013.01)

(58) Field of Classification Search
  CPC .............. G06F 9/4418; G06F 9/45533; G06F 9/45545; G06F 9/45558; G06F 9/5077; G06F 2009/45575
  See application file for complete search history.

(56) References Cited

U.S. PATENT DOCUMENTS

| 7,844,845 | B2 | 11/2010 | Chen et al. | |
| 7,937,701 | B2* | 5/2011 | Kinney | G06F 9/544 |
| | | | | 713/300 |
| 8,185,766 | B2 | 5/2012 | Barde | |
| 8,407,516 | B2 | 3/2013 | Swanson et al. | |
| 8,464,086 | B2 | 6/2013 | Cepulis | |
| 8,549,517 | B2* | 10/2013 | Koma | H04L 29/12283 |
| | | | | 718/1 |
| 9,092,251 | B2* | 7/2015 | Grouzdev | G06F 9/45558 |
| 2004/0215911 | A1* | 10/2004 | Ouren | G06F 9/4418 |
| | | | | 711/170 |
| 2004/0236934 | A1* | 11/2004 | Zimmer | G06F 9/4411 |
| | | | | 713/1 |
| 2004/0243534 | A1* | 12/2004 | Culter | G06F 9/4411 |
| 2006/0036889 | A1* | 2/2006 | Arai | G06F 11/203 |
| | | | | 714/1 |
| 2008/0022032 | A1* | 1/2008 | Nicholas | G06F 9/4418 |
| | | | | 711/100 |

(Continued)

OTHER PUBLICATIONS

Shinagawa et al., "BitVisor: a thin hypervisor for enforcing i/o device security," 2009, Proceedings of the 2009 ACM SIGPLAN/SIGOPS international conference on Virtual execution environments, pp. 121-130. (Year: 2009).*

(Continued)

*Primary Examiner* — Tuan Q Dam
*Assistant Examiner* — Stephen D Berman
(74) *Attorney, Agent, or Firm* — Lowenstein Sandler LLP (57) ABSTRACT

A system and method for system table modification in a virtualized computer system are disclosed. In accordance with one embodiment, a hypervisor that is executed by a computer system detects an attempt by a guest operating system of a virtual machine to access a system table. In response to the detecting, the hypervisor determines a hardware configuration of the virtual machine, and populates one or more entries of the system table in view of the hardware configuration.

13 Claims, 7 Drawing Sheets

(56) References Cited

U.S. PATENT DOCUMENTS

| | | | |
|---|---|---|---|
| 2009/0144570 A1* | 6/2009 | Chen | G06F 1/3203 713/320 |
| 2010/0162241 A1* | 6/2010 | Koma | H04L 29/12283 718/1 |
| 2010/0162242 A1* | 6/2010 | Grouzdev | G06F 9/45558 718/1 |
| 2010/0218183 A1* | 8/2010 | Wang | G06F 1/3228 718/1 |
| 2011/0141124 A1* | 6/2011 | Halls | G06F 21/83 345/522 |
| 2011/0167422 A1* | 7/2011 | Eom | G06F 9/45558 718/1 |
| 2011/0194563 A1* | 8/2011 | Shen | G06F 9/45558 370/395.52 |
| 2011/0314203 A1* | 12/2011 | Chen | G06F 9/45558 711/6 |
| 2012/0102580 A1* | 4/2012 | Bealkowski | G06F 21/86 726/34 |
| 2012/0173842 A1* | 7/2012 | Frey | G06F 9/45558 711/207 |
| 2012/0221729 A1* | 8/2012 | Hara | G06F 3/0605 709/226 |
| 2012/0233378 A1* | 9/2012 | Elteto | G06F 9/45558 711/6 |
| 2014/0047174 A1* | 2/2014 | Sakthikumar | G06F 12/1425 711/105 |
| 2014/0059160 A1* | 2/2014 | Chernoff | H04L 49/70 709/217 |
| 2014/0298340 A1* | 10/2014 | Imaizumi | G06F 12/0284 718/1 |

OTHER PUBLICATIONS

Morgen et al., "Virtualization for high-performance computing," 2006, ACM SIGOPS Operating Systems Review, vol. 40 Issue 2, pp. 8-11. (Year: 2006).*

Sailer et al., "Building a MAC-based security architecture for the Xen open-source hypervisor," 2006, 21st Annual Computer Security Applications Conference, pp. 1-10. (Year: 2006).*

Shelton, E., "Re: [Xen-level] Loading Custom ACPI Tables?" Xen project mailing list, Apr. 22, 2013, 2 pages, Xen Project, downloaded from http://lists.xen.org/archives/html/xen-devel/2013-04/msg02087.html on Jun. 8, 2016.

Tsirkin, M., "[Qemu-devel] [Patch v7 00/26] Qemu: Generate ACPI Tables for the Guest" Qemu-devel, Oct. 3, 2013, 5 pages, downloaded from http://lists.nongnu.org/archive/html/qemu-devel/2013-10/msg00425.html on Jun. 8, 2016.

Dow, E et al., "The Xen Hypervisor," Xen Boot Options, Running Xen: A Hands-On Guide to the Art of Virtualization, Apr. 10, 2008, 9 pages, downloaded from http://www.informit.com/articles/article.aspx?p=1187966&seqNum=4, on Jun. 8, 2016.

* cited by examiner

POPULATION OF SYSTEM TABLES BY HYPERVISOR

TECHNICAL FIELD

This disclosure relates to computer systems, and more particularly, to virtualized computer systems.

BACKGROUND

An operating system (OS) is a set of programs that manage computer hardware resources and provide common services for application software. For hardware functions such as input and output and memory allocation, the operating system typically acts as an intermediary between application programs and hardware. Operating systems may be found on a variety of devices, including desktop computers, servers, smartphones, video game consoles, and so forth.

The Advanced Configuration and Power Interface (ACPI) specification provides an open standard for device configuration and power management by the operating system. The ACPI specification defines four global "Gx" states G0 through G3, six sleep "Sx" states S0 through S5, four device states D0 through D3, four processor states C0 through C3, and up to 17 implementation-dependent power-performance states P0 through Pn, where n is an integer between 1 and 16 inclusive. In addition, ACPI defines several tables that provide an interface between an ACPI-compliant operating system and system firmware, including a Differentiated System Description Table (DSDT), a Secondary System Description Table (SSDT), and a System Resource Affinity Table (SRAT).

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and methods for populating Advanced Configuration and Power Interface (ACPI) tables in virtualized computer systems by a hypervisor. In one embodiment, a hypervisor detects an attempt by a guest operating system of a virtual machine to access a system table. In response, the hypervisor determines a hardware configuration of the virtual machine, and populates one or more entries of the system table in view of the hardware configuration.

In accordance with one example, the hypervisor responds to a guest access of an ACPI table only when a flag is in a first state, and sets the flag to a second state after populating the system table. When the hypervisor receives a request to reset the virtual machine, the hypervisor reverts the ACPI table to its original (i.e., pre-access) state and sets the flag back to the first state.

In some examples, the hypervisor performs an address range processing procedure after population of the ACPI table. In one such example, the hypervisor builds a list of address ranges that are unusable and/or unsupported by hardware, identifies a new address range that falls between two consecutive ranges of the list, and adds an entry to the ACPI table associating the new address range with a PCI device. In another such example, the hypervisor identifies an address range that is unusable and/or unsupported by hardware and adds an entry to the system table specifying the address range as a resource of a hardware device.

Embodiments of the present disclosure thus enable ACPI tables to be populated by the hypervisor, rather than by the virtual machine, as is typically done in the prior art. More particularly, in virtualized systems of the prior art, the hypervisor typically executes firmware code within the virtual machine that scans hardware devices and populates ACPI tables. Because the data in the ACPI tables may depend on how the firmware has initialized Peripheral Component Interconnect (PCI) devices, the ACPI tables must be populated by the firmware in the VM, rather than by the hypervisor. Consequently, the hypervisor must supply information about itself (e.g., memory layout, etc.) to the firmware so that the firmware can populate the ACPI tables correctly. Moreover, because the ACPI tables are stored in areas of memory that are read-only to guests, the contents of the ACPI tables must remain fixed during the lifetime of the virtual machine.

Embodiments of the present disclosure thus eliminate the need for special firmware in the VM to populate ACPI tables, and consequently the need for the hypervisor to supply information to such firmware to perform the table population correctly. In addition, embodiments of the present disclosure enable ACPI tables to be updated and/or restored to their original state while the VM is active, in contrast to the prior art where the ACPI tables must be static. It should be noted that while the present disclosure is described with respect to ACPI tables, embodiments of the present disclosure may also be employed for other types of operating system tables.

Figure 1:
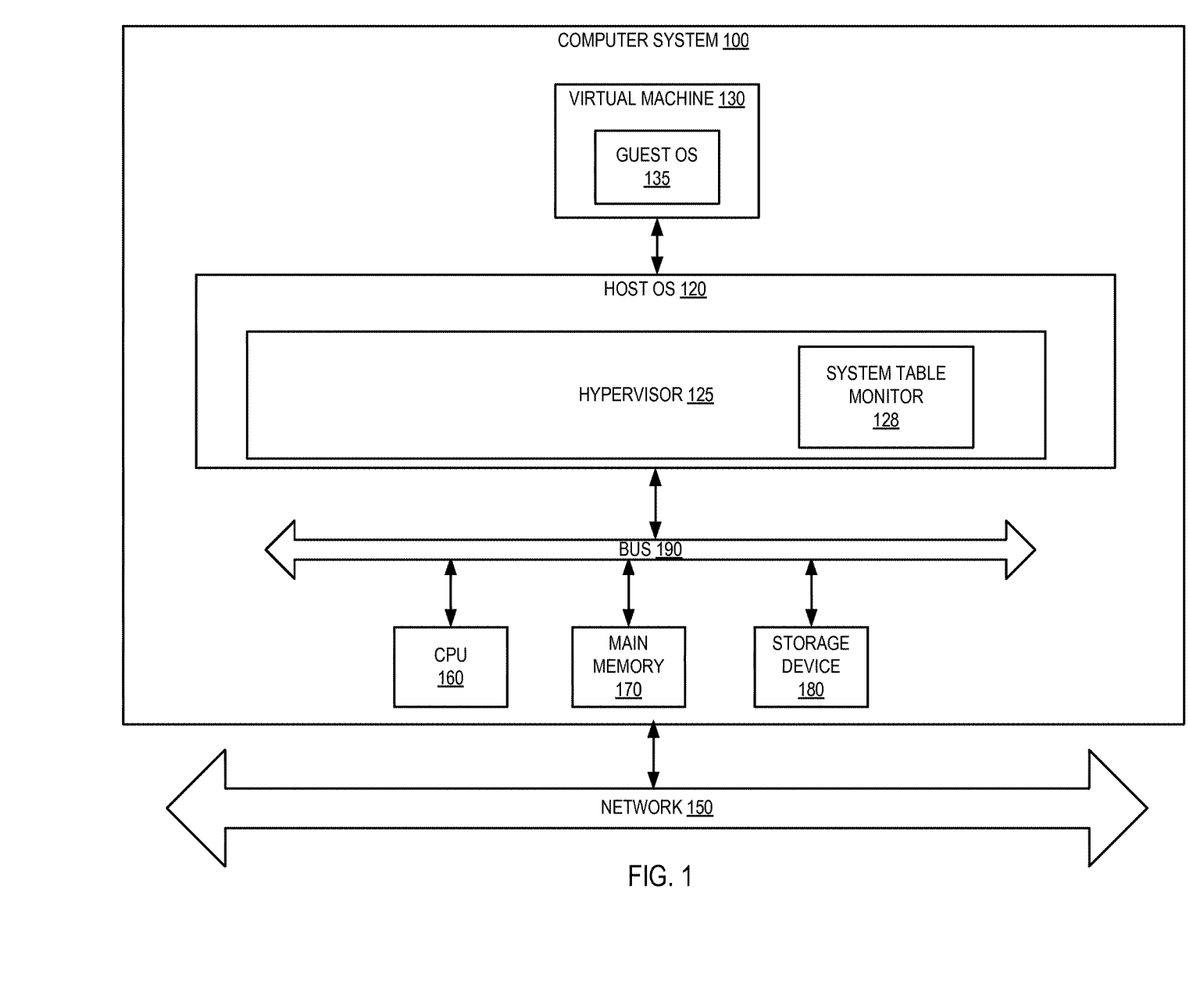
FIG. 1 depicts an illustrative computer system architecture, in accordance with an embodiment of the present disclosure.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing units (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.), connected by a bus 190 (e.g., a Peripheral Component Interconnect [PCI] bus, a Universal Serial Bus [USB}, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120 that manages the hardware resources of the computer system and that provides functions such as interprocess communication, scheduling, virtual memory management, and so forth. In some examples, host operating system 120 also comprises a hypervisor 125, which provides a virtual operating platform for virtual machine 130 and that manages its execution. Virtual machine 130 is a software implementation of a machine that executes programs as though it were an actual physical machine, and that includes a guest operating system (OS) 135 that manages the execution of these programs. It should be noted that although, for simplicity, a single virtual machine is depicted in FIG. 1, in some other embodiments computer system 100 may host a plurality of virtual machines.

In accordance with one example, hypervisor 125 may include a system table monitor 128 that is capable of detecting attempts by a guest operating system of a virtual machine (e.g., guest OS 135 of VM 130, etc.) to access a system table (e.g., an Advanced Configuration and Power Interface [ACPI] table, etc.), of determining a hardware configuration of the virtual machine, of populating entries of the system table in view of the hardware configuration, of performing address range processing with respect to the system table, and of reverting the system table to its original state, as described below with respect to FIGS. 3 through 6. It should be noted that in some other examples, hypervisor 125 may be external to host OS 120, rather than embedded within host OS 120.

Figure 2:
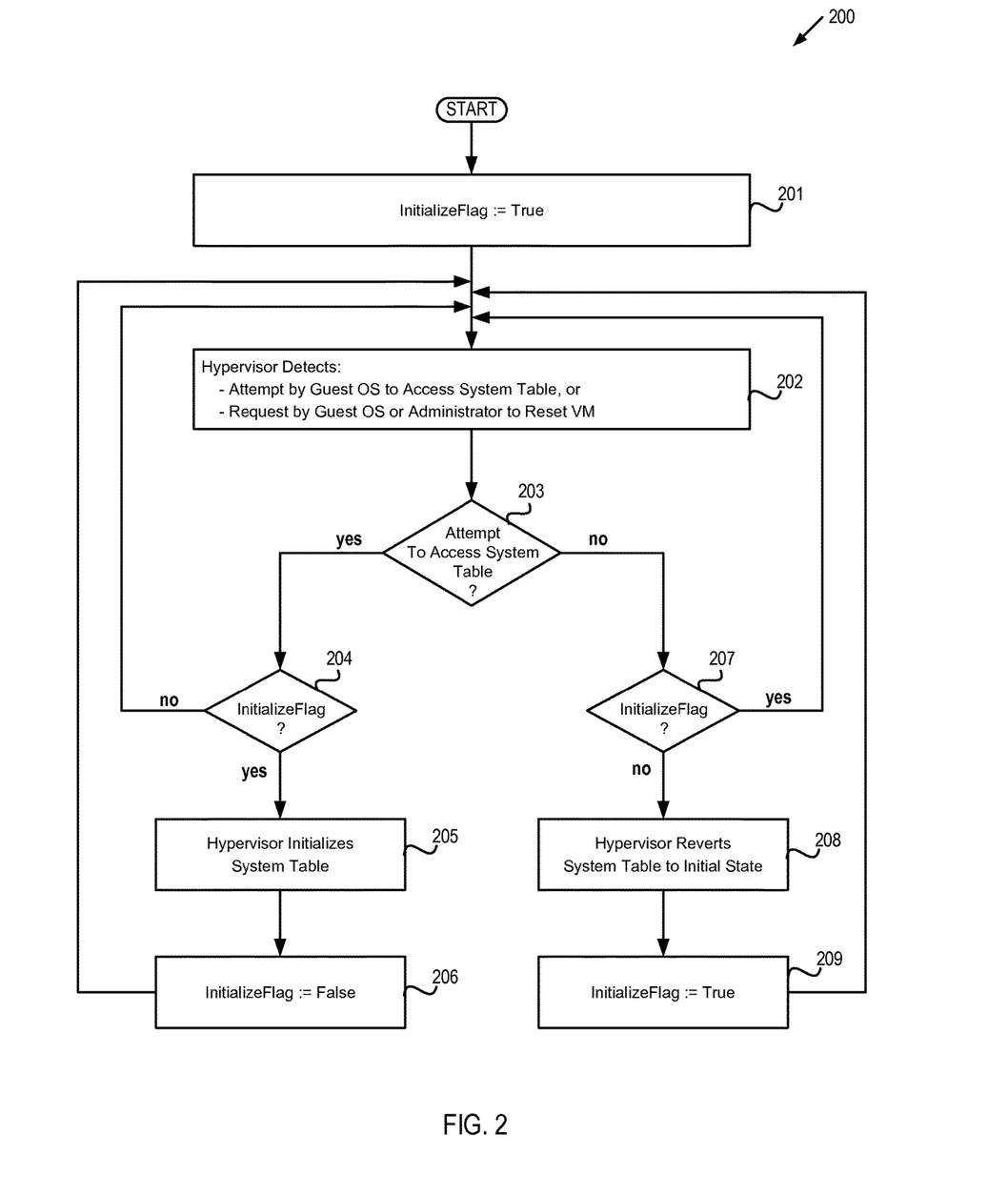
FIG. 2 depicts a flow diagram of one embodiment of a method by which a hypervisor manages a system table.

FIG. 2 depicts a flow diagram of one embodiment of a method 200 by which a hypervisor manages a system table. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. In one embodiment, the system table is stored in an area of memory 170 that is read-only for guests (e.g., guest OS 135 of VM 130, etc.). It should be noted that in some embodiments blocks depicted in FIG. 2 may be performed simultaneously or in a different order than that depicted.

At block 201, hypervisor 125 sets Boolean variable InitializeFlag to true. In one embodiment, block 201, as well as subsequent blocks 202 through 209, are performed by system table manager 128 of hypervisor 125.

At block 202, hypervisor 125 detects either:
an attempt by a guest OS (e.g., guest OS 135 of VM 130, etc.) to access a system table (e.g., an Advanced Configuration and Power Interface [ACPI] table, etc.); or a request to reset a virtual machine (e.g., a request by guest OS 135 to reset VM 130, a request by a human administrator to reset VM 130, etc.).

Block 203 branches based on what was detected at block 202. If hypervisor 125 detected an attempt by a guest OS to access a system table, execution proceeds to block 204, otherwise execution continues at block 207.

Block 204 branches based on the value of InitializeFlag. If InitializeFlag is true, execution proceeds to block 205, otherwise execution continues back at block 202.

At block 205, hypervisor 125 initializes the system table. Embodiments of operations involved in performing block 205 are described in detail below with respect to FIGS. 3 through 5.

At block 206, hypervisor 125 sets Boolean variable InitializeFlag to false. After block 206, execution continues back at block 202.

Block 207 branches based on the value of InitializeFlag. If InitializeFlag is false, execution proceeds to block 208, otherwise execution continues back at block 202.

At block 208, hypervisor 125 reverts the system table to its original state. Embodiments of operations involved in performing block 208 are described in detail below with respect to FIG. 6.

At block 209, hypervisor 125 sets Boolean variable InitializeFlag to true. After block 209, execution continues back at block 202.

Figure 3:
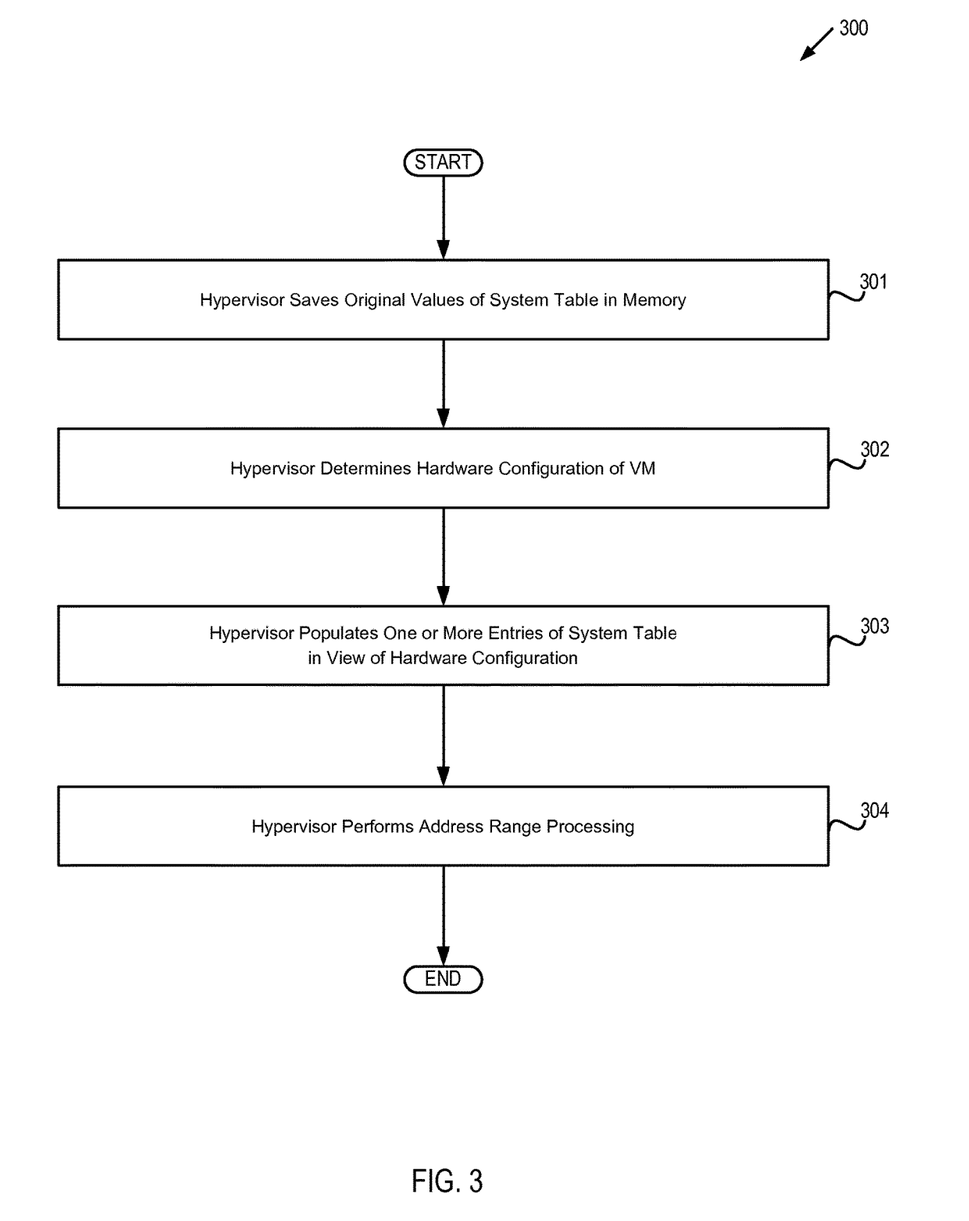
FIG. 3 depicts a flow diagram of one embodiment of a method by which a hypervisor initializes a system table.

FIG. 3 depicts a flow diagram of one embodiment of a method 300 by which a hypervisor initializes a system table. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. In one embodiment, the system table is stored in an area of memory 170 that is read-only for guests (e.g., guest OS 135 of VM 130, etc.). It should be noted that in some embodiments blocks depicted in FIG. 3 may be performed simultaneously or in a different order than that depicted.

At block 301, hypervisor 125 saves the current, original values of the system table to memory (e.g., an area of memory 170, an area of storage device 180, etc.). In one embodiment, the area of memory to which the original values are saved is inaccessible to guests (e.g., guest OS 135, etc.). In one embodiment, block 301, as well as subsequent blocks 302 through 304, are performed by system table manager 128 of hypervisor 125. It should be noted that in some embodiments, the system table may initially be "empty" (e.g., the system table may contain undefined values, special values that represent "empty", etc.).

At block 302, hypervisor 125 determines the current hardware configuration of the VM associated with the system table access attempt (e.g., VM 130, etc.). In one embodiment, the current hardware configuration may include which hardware devices of computer system 100 are present from the point of view of VM 130, the current values of configuration parameters of the hardware devices, hardware device orderings and priorities, and so forth.

At block 303, hypervisor 125 populates one or more entries of the system table in view of the hardware configuration (e.g., storing an identifier of a hardware device in a corresponding entry of the system table, storing a current configuration parameter value in a corresponding entry of the system table, etc.). At block 304, hypervisor 125 performs address range processing with respect to the system table. In one embodiment, the address range processing is performed to reflect changes made by firmware to the configuration of the hypervisor, or to the configuration of virtual hardware, or both (e.g., changes to firmware program addresses for virtual devices, etc.). Embodiments of operations involved in performing block 304 are described in detail below with respect to FIGS. 4 and 5.

Figure 4:
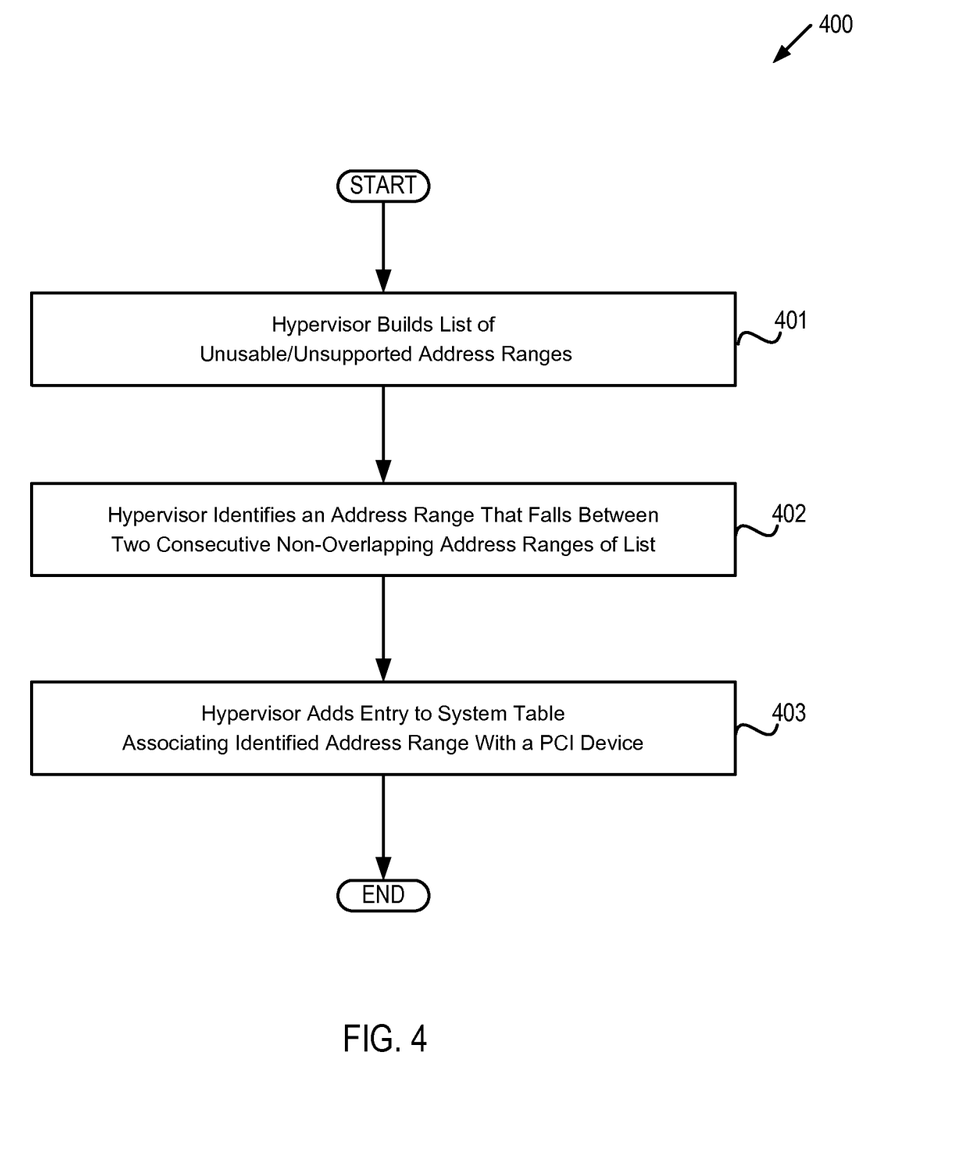
FIG. 4 depicts a flow diagram of one embodiment of a first method by which a hypervisor performs address range processing with respect to a system table.

FIG. 4 depicts a flow diagram of one embodiment of a first method 400 by which a hypervisor performs address range processing with respect to a system table. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 4 may be performed simultaneously or in a different order than that depicted.

At block 401, hypervisor 125 builds a list of address ranges, where each address range in the list has a respective starting address and a respective end address, and where the list is sorted by the respective start addresses, and where each address range in the list satisfies at least one of the following conditions:
  the address range is unusable by any Peripheral Component Interconnect (PCI) device;
  the address range is unsupported by hardware of computer system 100; or
  the address range is unsupported by guest operating system 135.

In one embodiment, block 401, as well as subsequent blocks 402 and 403, are performed by system table manager 128 of hypervisor 125.

At block 402, hypervisor 125 identifies an address range R that falls between two consecutive non-overlapping address ranges in the list. In one embodiment, address range R may comprise 32-bit memory addresses, or 64-bit memory addresses, or both, and may or may not include I/O addresses. At block 403, hypervisor 125 adds an entry to the system table that associates address range R with a particular PCI device of computer system 100.

Figure 5:
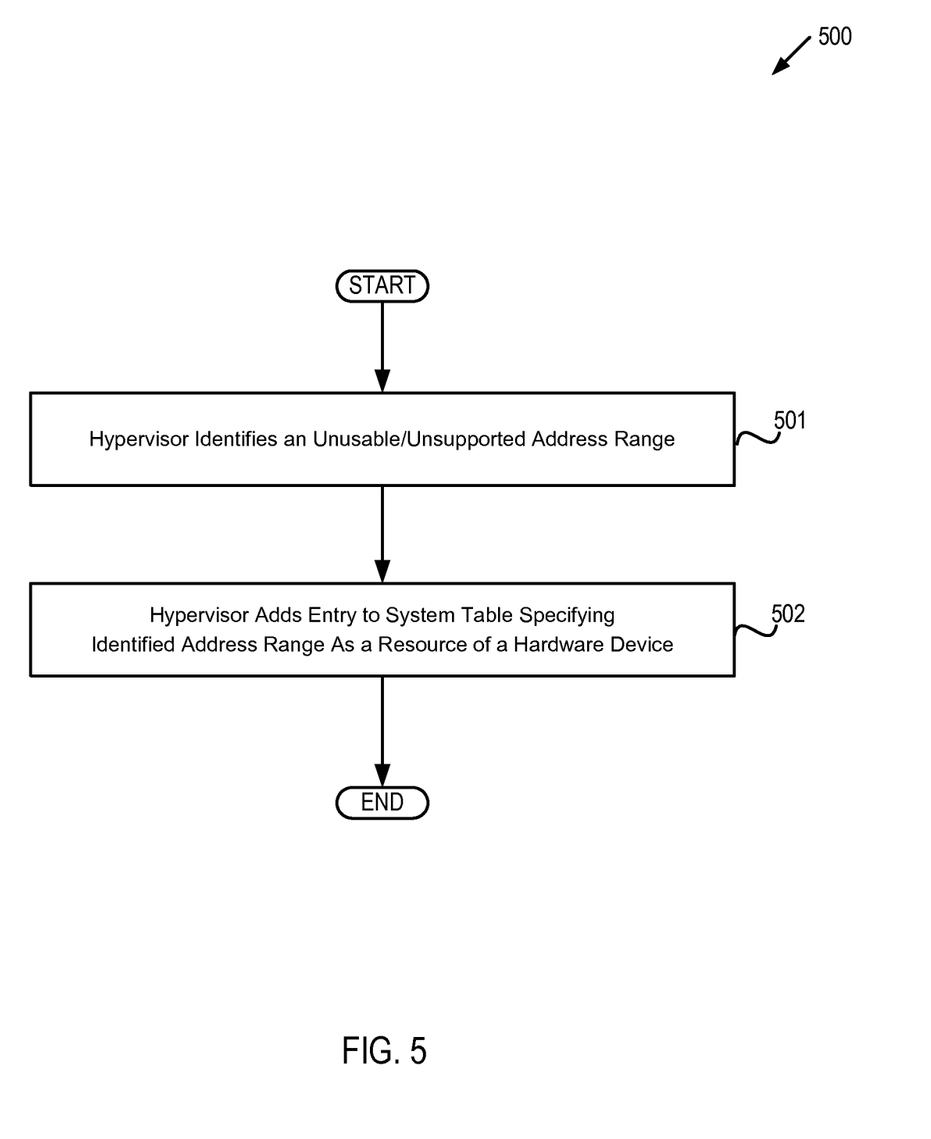
FIG. 5 depicts a flow diagram of one embodiment of a second method by which a hypervisor performs address range processing with respect to a system table.

FIG. 5 depicts a flow diagram of one embodiment of a second method 500 by which a hypervisor performs address range processing with respect to a system table. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine.

At block 501, hypervisor 125 identifies an address range A that satisfies at least one of the following conditions:
  the address range is unusable by any Peripheral Component Interconnect (PCI) device;
  the address range is unsupported by hardware of computer system 100; or
  the address range is unsupported by guest operating system 135.

In one embodiment, block 501, as well as subsequent block 502, are performed by system table manager 128 of hypervisor 125.

At block 502, hypervisor 125 adds to the system table an entry specifying address range A as a resource of a hardware device of computer system 100. In one embodiment, blocks 501 and 502 are performed by system table manager 128 of hypervisor 125.

Figure 6:
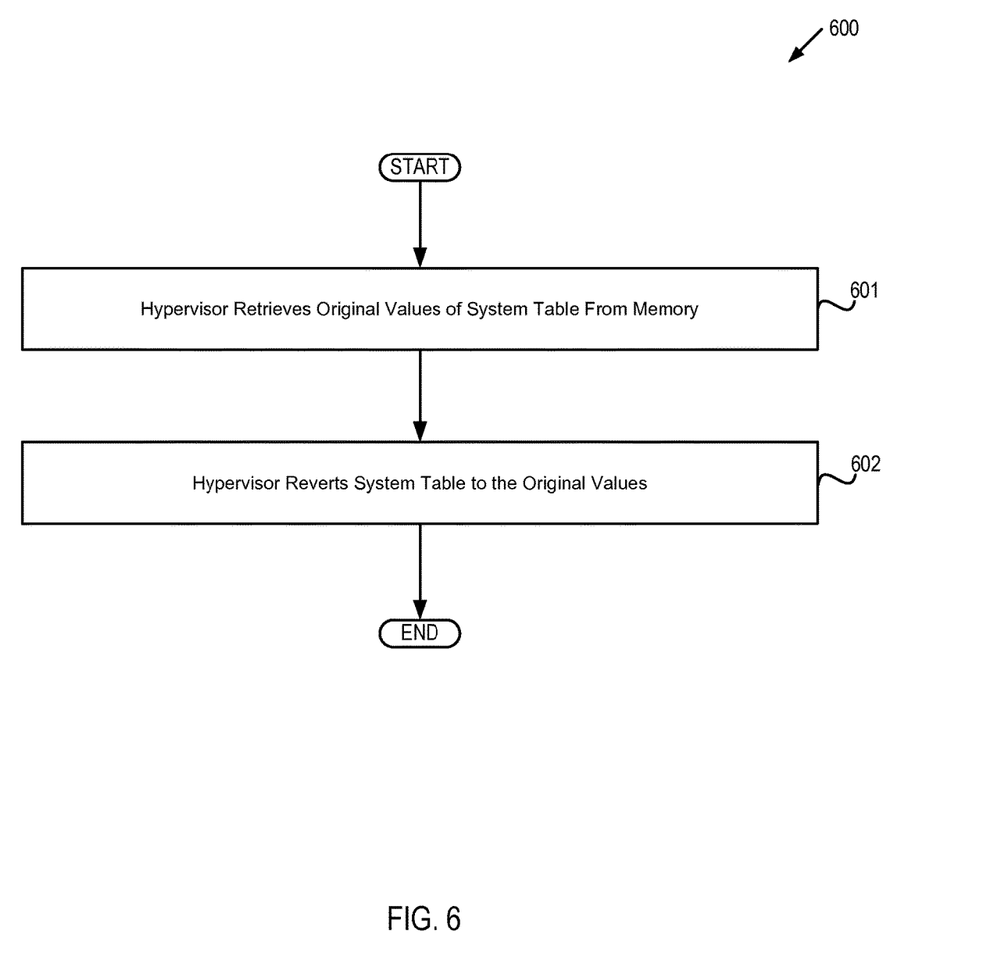
FIG. 6 depicts a flow diagram of one embodiment of a method by which a hypervisor reverts a system table to its original state.

FIG. 6 depicts a flow diagram of one embodiment of a method 600 by which a hypervisor reverts a system table to its original state. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine.

At block 601, hypervisor 125 retrieves the original values of the system table that were stored in memory at block 301. At block 602, hypervisor 125 reverts the contents of the system to the original values.

Figure 7:
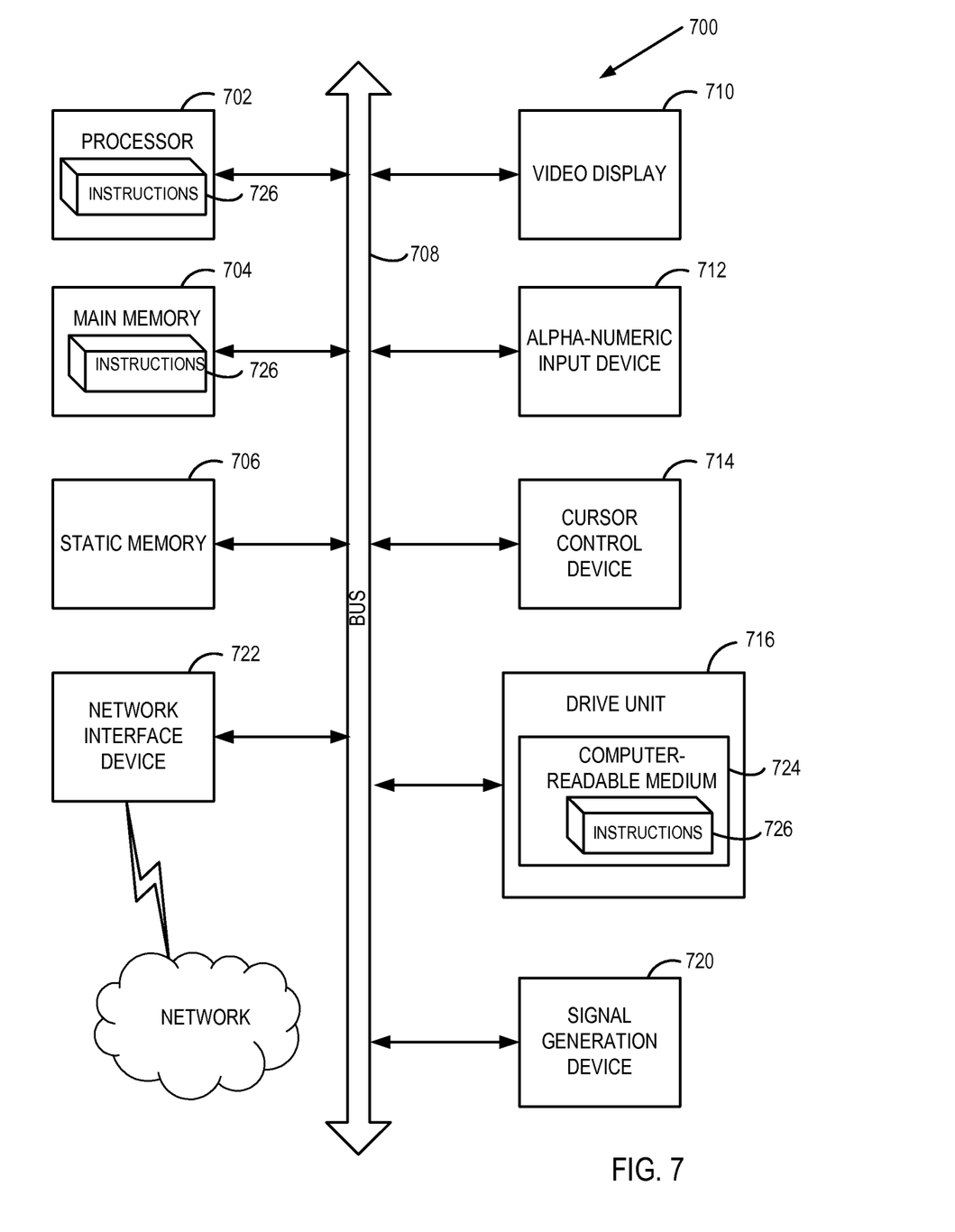
FIG. 7 depicts a block diagram of an illustrative computer system operating in accordance with embodiments of the disclosure.

FIG. 7 illustrates an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 706.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable medium 724 on which is stored one or more sets of instructions 726 (e.g., instructions corresponding to the methods of FIGS. 3 and 4, etc.) embodying any one or more of the methodologies or functions described herein. Instructions 726 may also reside, completely or at least partially, within the main memory 704 and/or within the processor 702 during execution thereof by the computer system 700, the main memory 704 and the processor 702 also constituting computer-readable media. Instructions 726 may further be transmitted or received over a network via the network interface device 722.

While the computer-readable storage medium 724 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "detecting", "determining", "populating", "storing", "building", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   detecting, by a hypervisor executed by a processing device of a computer system, an attempt by a guest operating system of a virtual machine to access a memory location in a system table, wherein the virtual machine is managed by the hypervisor on the computer system;
   responsive to detecting the attempt, determining, by the hypervisor, a hardware configuration of the virtual machine that indicates which hardware device of a plurality of hardware devices of the computer system is accessible to the virtual machine;
   identifying, by the hypervisor, a first address range which is unusable by the hardware device in view of the hardware configuration and a second address range in which the hardware device is unusable in view of the guest operating system of the virtual machine, wherein the first address range is different from the second address range;
   selecting, by the hypervisor, an address range to support the hardware device in view of the first address range and the second address range, wherein the selected address range is different from the first address range and the second address range;

updating, by the hypervisor, a flag from a first state to a second state for entries in the system table representing the selected address range, wherein original values of the entries in the system table are stored responsive to updating the flag;

overriding, by the hypervisor, one or more values of the entries of the system table for the hardware device in view of the selected address range; and responsive to detecting a request to reset the virtual machine associated with the hardware device, reverting, by the hypervisor, the system table to the original values and the flag to the first state.

2. The method of claim 1, wherein the system table is an Advanced Configuration and Power Interface (ACPI) table.

3. The method of claim 1, wherein the system table is stored in an area of memory that is read-only for the guest operating system.

4. The method of claim 1, further comprising building, by the hypervisor, a list of address ranges, each of the address ranges to comprise a respective start address and a respective end address, wherein each address range of the list is at least one of: unusable by any Peripheral Component Interconnect (PCI) device, unsupported by hardware of the computer system, or unsupported by the guest operating system.

5. The method of claim 1, further comprising adding to the system table, by the hypervisor, an entry that specifies an address range as a resource of a hardware device of the plurality of hardware devices.

6. A computer system comprising:
a memory to store a system table; and
a processing device, operatively coupled to the memory, to:
detect, by a hypervisor executed by the processing device, an attempt by a guest operating system of a virtual machine to access a memory location in the system table;
responsive to detecting the attempt, determine, by the hypervisor, a hardware configuration of the virtual machine that indicates which hardware device of a plurality of hardware devices of the computer system is accessible to the virtual machine;
identify, by the hypervisor, a first address range which is unusable by the hardware device in view of the hardware configuration and a second address range in which the hardware device is unusable in view of the guest operating system of the virtual machine, wherein the first address range is different from the second address range;
select, by the hypervisor, an address range to support the hardware device in view of the first address range and the second address range, wherein the selected address range is different from the first address range and the second address range;
update, by the hypervisor, a flag from a first state to a second state for entries in the system table representing the selected address range, wherein original values of the entries in the system table are stored responsive to updating the flag;
override, by the hypervisor, one or more values of the entries of the system table for the hardware device in view of the selected address range; and
responsive to detecting a request to reset the virtual machine associated with the hardware device, revert,
by the hypervisor, the system table to the original values and the flag to the first state.

7. The computer system of claim 6, wherein the system table is an Advanced Configuration and Power Interface (ACPI) table.

8. The computer system of claim 6, wherein the processing device is further to build, by the hypervisor, a list of address ranges, each of the address ranges to comprise a respective start address and a respective end address, wherein each address range of the list is at least one of: unusable by any Peripheral Component Interconnect (PCI) device, unsupported by hardware of the computer system, or unsupported by the guest operating system.

9. The computer system of claim 6, wherein the processing device is further to add to the system table, by the hypervisor, an entry that specifies an address range as a resource of the hardware device of the plurality of hardware devices.

10. A non-transitory computer readable storage medium, having instructions stored therein, which when executed, cause a processing device of a computer system to:
detect, by a hypervisor executed by the processing device, an attempt by a guest operating system of a virtual machine to access a memory location in a system table;
responsive to detecting the attempt, determine, via the hypervisor, a hardware configuration of the virtual machine that indicates which hardware device of a plurality of hardware devices of the computer system is accessible to the virtual machine;
identify, by the hypervisor, a first address range which is unusable by the hardware device in view of the hardware configuration and a second address range in which the hardware device is unusable in view of the guest operating system of the virtual machine, wherein the first address range is different from the second address range;
select, by the hypervisor, an address range to support the hardware device in view of the first address range and the second address range, wherein the selected address range is different from the first address range and the second address range;
update, by the hypervisor, a flag from a first state to a second state for entries in the system table representing the selected address range, wherein original values of the entries in the system table are stored responsive to updating the flag;
override, via the hypervisor, one or more values of the entries of the system table for the hardware device in view of the selected address range; and
responsive to detecting a request to reset the virtual machine associated with the hardware device, revert, by the hypervisor, the system table to the original values and the flag to the first state.

11. The non-transitory computer readable storage medium of claim 10, wherein the system table is an Advanced Configuration and Power Interface (ACPI) table.

12. The non-transitory computer readable storage medium of claim 10, wherein the processing device is further to build, by the hypervisor, a list of address ranges, each of the address ranges to comprise a respective start address and a respective end address, wherein each address range of the list is at least one of: unusable by any Peripheral Component Interconnect (PCI) device, unsupported by hardware of the computer system, or unsupported by the guest operating system.

13. The non-transitory computer readable storage medium of claim 10, wherein the processing device is further to add to the system table, by the hypervisor, an entry that specifies an address range as a resource of the hardware device of the plurality of hardware devices.

\* \* \* \* \*